US008457003B2

(12) United States Patent
Yamada et al.

(10) Patent No.: US 8,457,003 B2
(45) Date of Patent: Jun. 4, 2013

(54) CONTROLLER THAT INSTRUCTS DATA TO BE HELD WHEN A NETWORK ABNORMALITY IS DETECTED

(75) Inventors: Hiroaki Yamada, Kyoto (JP); Masahiro Nishi, Ritto (JP)

(73) Assignee: Omron Corporation, Kyoto (JP)

( * ) Notice: Subject to any disclaimer, the term of this patent is extended or adjusted under 35 U.S.C. 154(b) by 167 days.

(21) Appl. No.: 12/712,920

(22) Filed: Feb. 25, 2010

(65) Prior Publication Data
US 2011/0026407 A1  Feb. 3, 2011

(30) Foreign Application Priority Data
Jul. 31, 2009 (JP) ................... 2009-179926

(51) Int. Cl.
*H04W 24/00* (2009.01)
*H04L 12/26* (2006.01)
(52) U.S. Cl.
USPC .............. 370/245; 370/241; 370/242; 700/21
(58) Field of Classification Search
USPC .............. 370/241, 242, 245; 700/21
See application file for complete search history.

(56) References Cited

U.S. PATENT DOCUMENTS

| 4,768,190 | A | * | 8/1988 | Giancarlo | ............... | 370/400 |
|---|---|---|---|---|---|---|
| 7,702,401 | B2 | * | 4/2010 | Eryurek et al. | ........... | 700/21 |
| 2008/0270744 | A1 | * | 10/2008 | Hashimoto | ............ | 711/217 |
| 2009/0062933 | A1 | | 3/2009 | Eryurek et al. | | |
| 2009/0182798 | A1 | * | 7/2009 | Chang et al. | ............. | 709/201 |

FOREIGN PATENT DOCUMENTS

| EP | 1 703 348 B1 | 10/2010 |
|---|---|---|
| JP | 2000-224184 A | 8/2000 |

OTHER PUBLICATIONS

European Patent Office extended search report on application 10153976.5 dated Mar. 22, 2012; 8 pages.

* cited by examiner

*Primary Examiner* — Un C Cho
*Assistant Examiner* — Siming Liu
(74) *Attorney, Agent, or Firm* — Foley & Lardner LLP

(57) ABSTRACT

This invention enables an abnormality analysis to be easily and reliably performed in the FA system of the EtherCAT (registered trademark). A controller has a protocol monitor function of operating in a monitor system program, and constantly monitors data communicated with a remote device. The controller has an abnormality diagnosis function of detecting abnormality, and thus holds the data monitored immediately before when abnormality is detected. As the protocol monitor function is incorporated, a protocol monitor does not need to be newly plugged into the network as an external device after the occurrence of abnormality, and the data that becomes the cause can be held from the abnormality that occurred first by monitoring from the beginning of the operation of the system and can be used for analysis.

4 Claims, 9 Drawing Sheets

CONTROLLER THAT INSTRUCTS DATA TO BE HELD WHEN A NETWORK ABNORMALITY IS DETECTED

This application is based on Japanese Patent Application No. 2009-179926 filed with the Japan Patent Office on Jul. 31, 2009, the entire content of which is hereby incorporated by reference.

BACKGROUND OF THE INVENTION

1. Technical Field

The present invention relates to a controller, and more specifically, to a technique of monitoring data transmitted and received between a controller configuring an FA system and a device/apparatus such as a remote device.

2. Related Art

The network system in FA (Factory Automation) has one or a plurality of PLCs (Programmable Logic Controller) responsible for the control of an input device and an output device of an industrial robot and other production facilities arranged inside a production factory, and a device which operation is controlled by the PLC connected to a network of a control system. The PLC and the device cyclically communicate through the network of the control system to transmit and receive IN data and OUT data (hereinafter referred to as I/O data), and control the production facilities.

FIG. 1 shows one part of the network system. In the example, Ethernet (registered trademark) is used as a communication protocol, and a controller 1 such as the PLC and the motion controller and a remote device 2 transmit and receive the I/O data through a switching hub 3. The controller 1 includes a CPU 1a responsible for control, a memory 11b for storing programs for the CPU 1a to operate, and a connection interface 1c for connecting to the network. The program stored in the memory 1b includes a system program for performing the basic operation, and a user control program (hereinafter also referred to as a user program) for actually performing the control. Other than the program, in the memory 1b, a work area used by the CPU 1a when executing the operation is ensured, and a memory area for storing the IO data and the like is ensured. A nonvolatile memory and a volatile memory are used for such memories depending on the application. As shown in the figure, the connection interface 1c includes an RJ45, which is a connector for attaching the terminal of a connection cable 5 complying with the communication protocol, a PT: pulse transformer, a PHY: physical layer, a Mac: media access controller, and the like.

The remote device 2 includes a connection connector 2a to the network such as the RJ45. The terminal of the communication cable 5 connected to the switching hub 3 is attached to the connection connector 2a to plug into the network. In FIG. 1, a plurality of remote devices 2 is drawn as if connected to one area of the switching hub 3 for the sake of convenience of illustration, but is connected to a plurality of ports arranged at the switching hub 3. The remote device 2 may further connect an external device 4 such as a motor if it operates on its own.

When failure occurs in the FA network system, the IO data is sometimes verified to analyze the cause etc. thereof. In this case, a protocol monitor 6 is connected to the network so that the IO data transmitted on the network is acquired at the protocol monitor 6, and the protocol monitor 6 performs analysis based on the acquired 10 data.

The protocol motor 6 includes a CPU 6a, a memory 6b, and a connection interface 6c with respect to the network. The connection interface 6c may have a configuration similar to that of the controller 1. The memory 6b includes a buffer area for storing system programs serving as a basic function for operating the protocol monitor 6, control conditions of the monitor function, and the acquired monitor data. The control conditions are set by the user or the technician specializing in network.

The monitor data buffer can automatically stop when receiving up to the buffer capacity, and can continue the operation continuously, as a ring buffer, to the control condition by discarding the data in order from the oldest. The monitor data of the monitor data buffer is generally saved as a file.

FIG. 2 shows an example of monitoring the IO data transmitted and received between the controller 1 and the servo driver, which serves as the remote device 2, in the network system. As shown in the figure, the controller 1, the remote device (servo driver) 2, and the protocol monitor 6 are connected to predetermined ports P1, P2, P3 of the switching hub 3. A port in the switching hub 3 is set as a mirror port and then the protocol monitor 6 is connected to such port for the protocol monitor 6 to acquire the data transmitted and received between the controller 1 and the remote device 2. The port P3 is the port set as the mirror port.

When set to such mirror port, all communication frame data transmitted and received at a certain port (port P2 connected with the remote device (servo driver) in the figure) are transferred to the mirror port (port P3). Thus, all communication frame data including the IO data can be captured by the protocol monitor by connecting the protocol monitor 6 to the mirror port.

FIG. 3 is a view showing a transmission/reception buffer structure of a driver unit in the protocol monitor 6, and a correlation of transmission/reception and transfer of the data. A reception buffer and a transmission buffer are ensured as a software structure of a general Ethernet (registered trademark) to realize a full-duplex communication (simultaneous execution of the reception process and the transmission process). The respective buffer generally forms a structure of the ring buffer by a plurality of buffer (eight, 0 to 7 in the figure) arrays, and a storage end pointer and a next storage pointer.

The function of the ring buffer will be described using the reception operation by way of example. The Ethernet controller provides the reception data mirrored and transferred from the switching hub 3 to the Ethernet driver unit (reception request). The Ethernet driver unit stores the reception data in the reception buffer ("reception buffer 6" in the figure) set with the next reception storage pointer by the reception request from the Ethernet controller. Thereafter, the next reception storage pointer is incremented by one to prepare for the next reception. The pointer is returned to the reception buffer 0 when reaching the end of the data array.

The high-order module (TCP/IP and frame monitor in the figure) reads out the reception data stored in the reception buffer ("reception buffer 2" in the figure) indicated with the reception storage end pointer at an arbitrary timing, and the read reception data is stored in the monitor data buffer in the memory 6c. Thereafter, the reception storage end pointer is incremented by one to prepare for the next reading. The pointer is returned to the reception buffer 0 when reaching the end of the data array. Therefore, continuous reception process is performed by assuming the data array as the ring structure by the data array and the process by the pointer. Such description is the same for the transmission process.

Therefore, the data transmitted and received between the controller 1 and the remote device 2 are stored in the monitor data buffer, and the analyzing function stored in the protocol monitor 6 is operated to analyze the data stored in the monitor data buffer. A management system using the protocol monitor is disclosed in Japanese Unexamined Patent Publication No. 2000-224184.

SUMMARY

In the management using the conventional protocol monitor, the protocol monitor 6 serving as an external device having the protocol monitor function is prepared in addition to the controller such as the PLC and the motion controller, and such protocol monitor 6 is connected to the mirror port of the switching hub 3 having the mirror port function to plug into the network.

Such protocol monitor function is required to be used when trouble occurs in the controller and the network configuration, and thus such protocol monitor is normally prepared after the trouble occurs, and then plugged into to the network. However, the trouble needs to be reproduced after plugging the protocol monitor 6 to the network to perform the analysis, and thus considerable time and effort are required to investigate the cause such as for a case with poor reproducibility.

If the switching hub existing in the FA network system does not correspond to the mirror port function, a switching hub having such function is to be newly prepared and replaced, which merely increases cost and complicates the replacement task.

Furthermore, the protocol monitor 6 used as the external device traces the data flowing on the network line, compares with the control condition set in the memory 6b, and controls the monitor function (start, stop of monitor). In order to correctly perform such control, the control condition (specific data pattern etc.) to register needs to be correctly performed, which can only be set by a technician familiar with the protocol monitor. Furthermore, the abnormality in the system that can be detected by the protocol monitor is merely the data pattern on the communication frame, and improperness of control timing, and those requiring advanced algorithm that depends on plural data cannot be detected.

In accordance with one aspect of the present invention, there is provided an FA controller including: abnormality diagnosis function of determining presence of abnormality of a network to be connected; protocol monitor function of monitoring data communicated with a device connected to the network; and function of holding the data monitored with the protocol monitor function in advance when abnormality is detected by the abnormality diagnosis function.

The controller includes a PLC and a motion controller. Such controller has a function of detecting abnormality (failure) of the device connected to itself and the network, and the network. The abnormality diagnosis function can be realized by the function of detecting abnormality. The abnormality diagnosis function can respond to various types of detectable abnormalities as the controller itself detects the abnormality thereof. That is, the protocol monitor prepared as a conventional external device detects abnormality from the pattern of the acquired data, and thus the detectable abnormality is limited and a time lag occurs even for detection. In the present invention, on the other hand, there are a great variety of detectable abnormalities, and detection can be made instantaneously. Thus, the possibility the data may get lost by the time lag in which the abnormality detection is delayed can be suppressed as much as possible. Furthermore, the controller incorporates the protocol monitor function, and an external device, a connection cable, and a switching hub having a mirror port function etc. do not need to be prepared when using the relevant function. Furthermore, the trouble reproduction experiment for performing the monitor does not need to be performed when the monitor operation is constantly started. Therefore, rapid response can be obtained based on the abnormality and the failure that occurred first. The protocol monitor function of the present invention merely needs to be a function of collecting and holding data, and may not have the function of analyzing based on the data. This obviously does not inhibit the provision of the function of analyzing. The data communicated with the device to be monitored may be the transmission data and the reception data, but is preferably at least the reception data received from device.

(2) A ring buffer is arranged, and the data communicated with the device adopts a communication method of once being stored in the ring buffer; where the ring buffer is set with a buffer amount larger than the buffer amount necessary for performing the communication, communicates with the device at the setting of the ring buffer with large buffer amount at normal times, uses the data held in the ring buffer as monitor data, continues the communication using a small region of one part where the data after abnormality is detected is stored in the ring buffer when abnormality is detected by the abnormality diagnosis function, and holds the data stored in regions other than the region used to continue the communication.

The communication at normal times can be performed using the ring buffer without any problem even if a ring buffer with large buffer amount is used. Since the buffer amount is large, a relatively great amount of past data is stored in the ring buffer, and hence the past data can also be used as monitor data. Therefore, a monitor data buffer does not need to be particularly prepared and the process of transferring data thereto is also eliminated, as opposed to the related art. When abnormality occurs, the data generated before the occurrence is held, and analysis is performed based on the data held thereafter. The communication can be continued even after the occurrence of abnormality since the small region functions as the ring buffer.

(3) The controller may correspond to Ethernet (registered trademark) or EtherCAT (registered trademark). In the present invention, the switching hub is not an essential configuration since the protocol monitor is not used as the external device. Thus, application can be preferably made to the EtherCAT (registered trademark). In other words, the EtherCAT (registered trademark) corresponds to high-speed communication, where the desired communication speed cannot be obtained, and the merits of the EtherCAT (registered trademark) is reduced by half if the switching hub is mounted as in the Ethernet (registered trademark). The high-speed communication can be maintained in the FA system of the EtherCAT (registered trademark) by using the present invention.

(4) On the premise of invention of (2), the ring buffer is assumed to be set in the Ethernet driver unit. The transfer to the monitor data buffer and the capture process are eliminated since the ring buffer set with a large buffer amount can be used as a conventional monitor data buffer. The communication process using the ring buffer can be performed regardless of the size of the buffer amount as long as a buffer amount of more than necessary can be ensured. Thus, high-speed can be more responded as the transfer process to the monitor data buffer is eliminated, and it becomes more suitable to the EtherCAT (registered trademark). Since the EtherCAT (registered trademark) can be complied, application can be made also to the network system of the communication protocol corresponding to the Ethernet (registered trademark).

In the present invention, if abnormality (failure) is detected with the controller, the data (monitor data) monitored and acquired before can be held instantaneously since the protocol monitor function is incorporated in the controller. There are a great variety of detectable abnormalities (failures), and monitoring for analyzing the cause of the various types of abnormalities can be performed.

If communication is performed using a ring buffer with large buffer amount, the state in which the past data is stored in the ring buffer last long compared to the device adopting a communication method using a general ring buffer, and thus the ring buffer can be used as a storage region of the monitor data. As a result, the process of separately transferring and copying the past data to the monitor data buffer and the like as in the related art is eliminated, whereby the configuration can be simplified and the process becomes simple and convenient and also high-speed respondable. Furthermore, when abnormality occurs, the past data can be held without being lost by overwrite involved in the communication by narrowing the region of the ring buffer to use for communication. Therefore, the held data are subsequently analyzed with the analyzing device, and the like, which can then be used to specify the cause of abnormality and the like.

DETAILED DESCRIPTION

Figure 1:
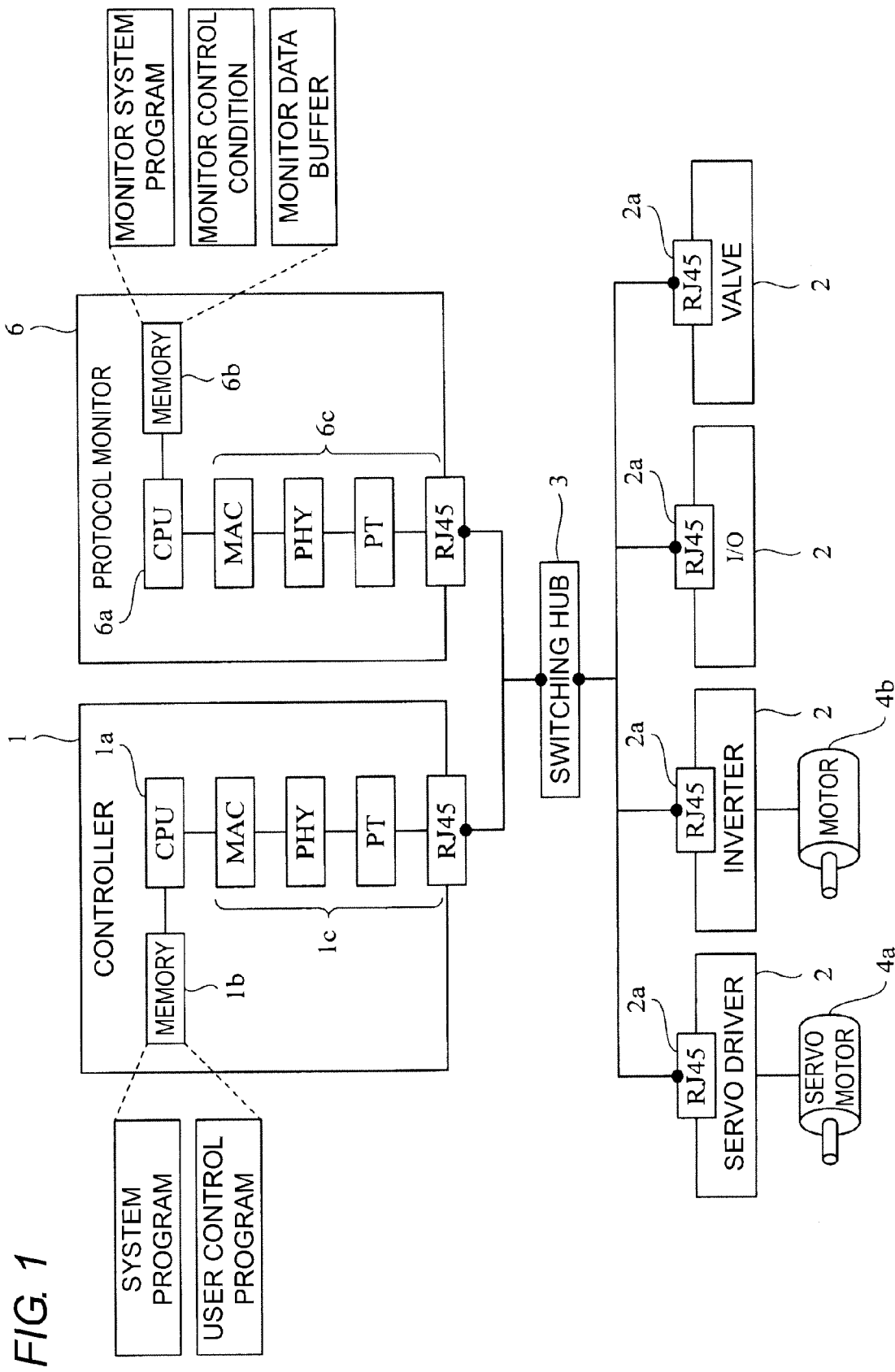
FIG. 1 is a view showing a conventional example.
Figure 2:
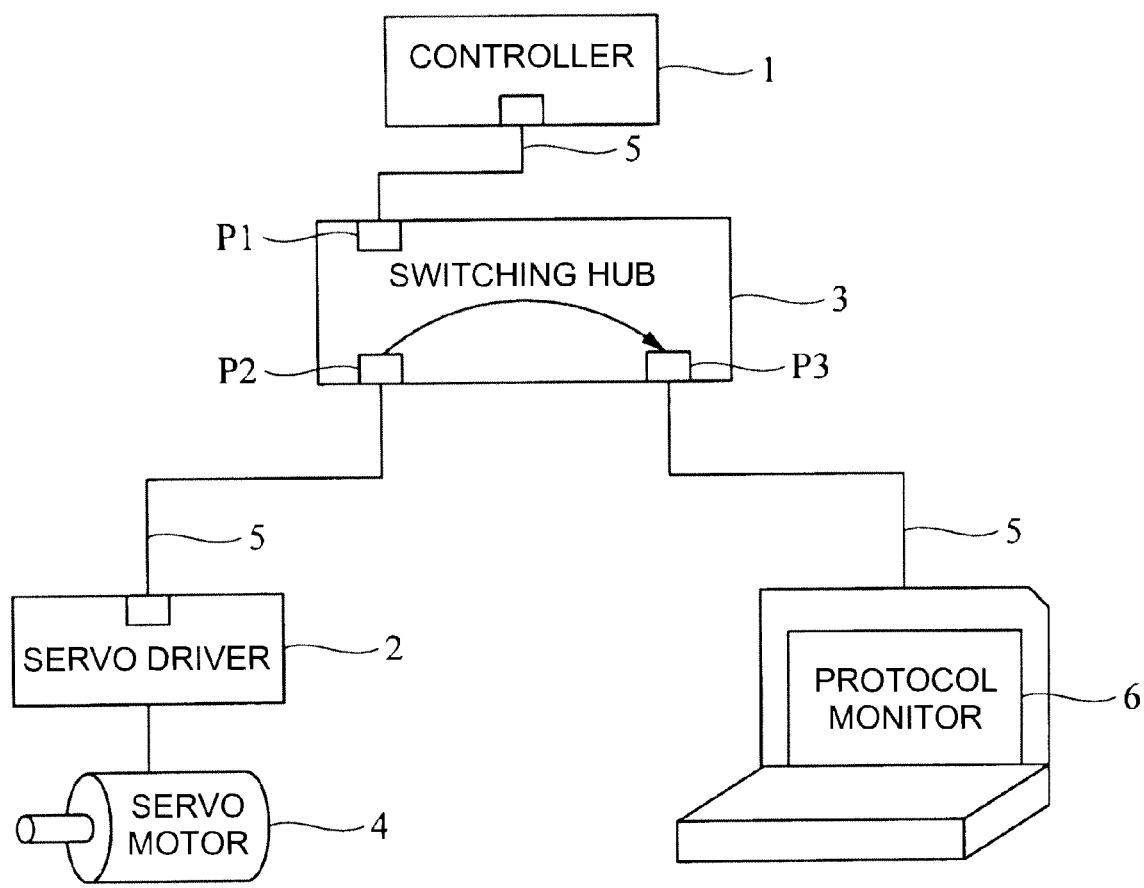
FIG. 2 is a view showing a conventional example.
Figure 3:
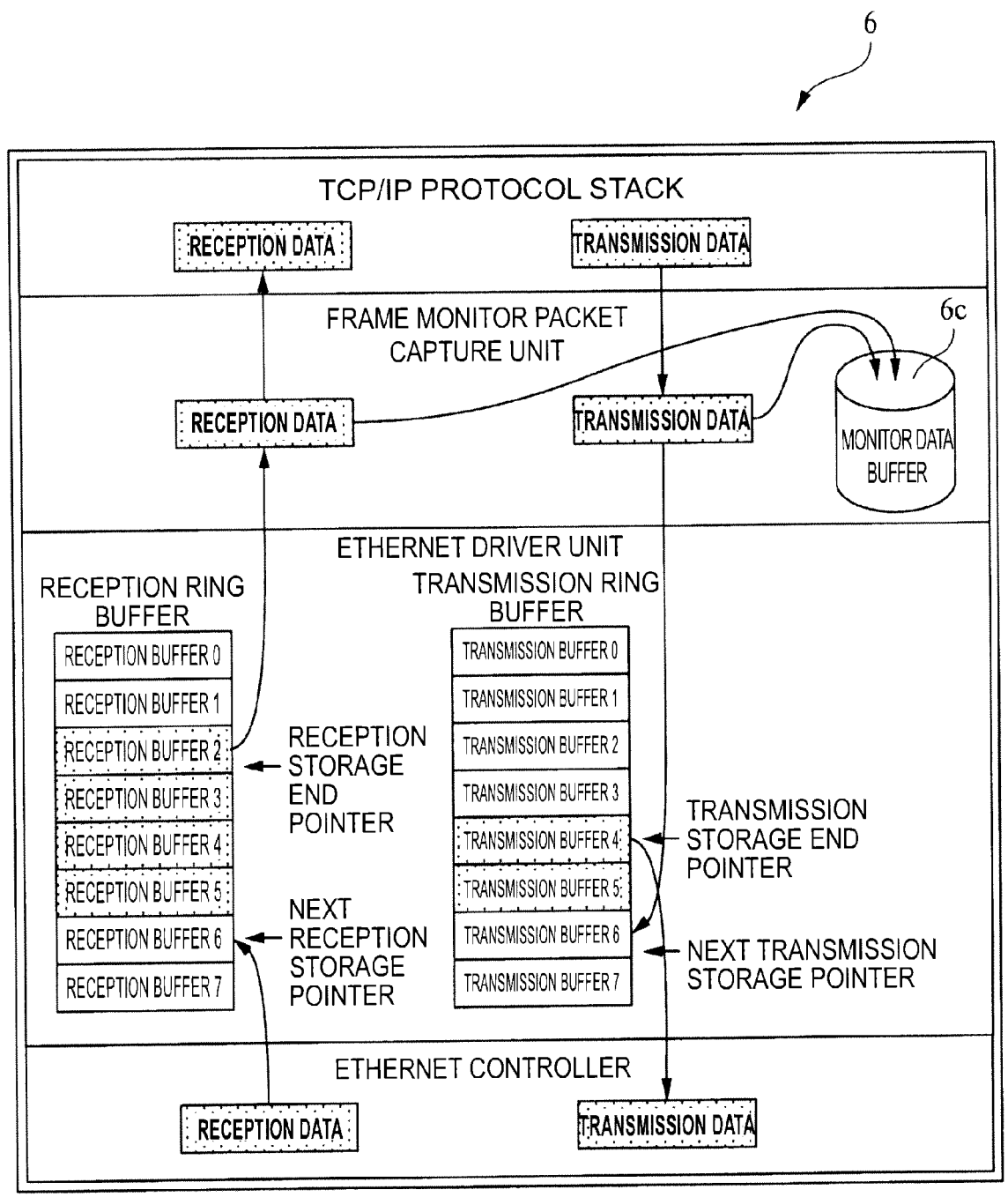
FIG. 3 is a view showing a conventional example.
Figure 4:
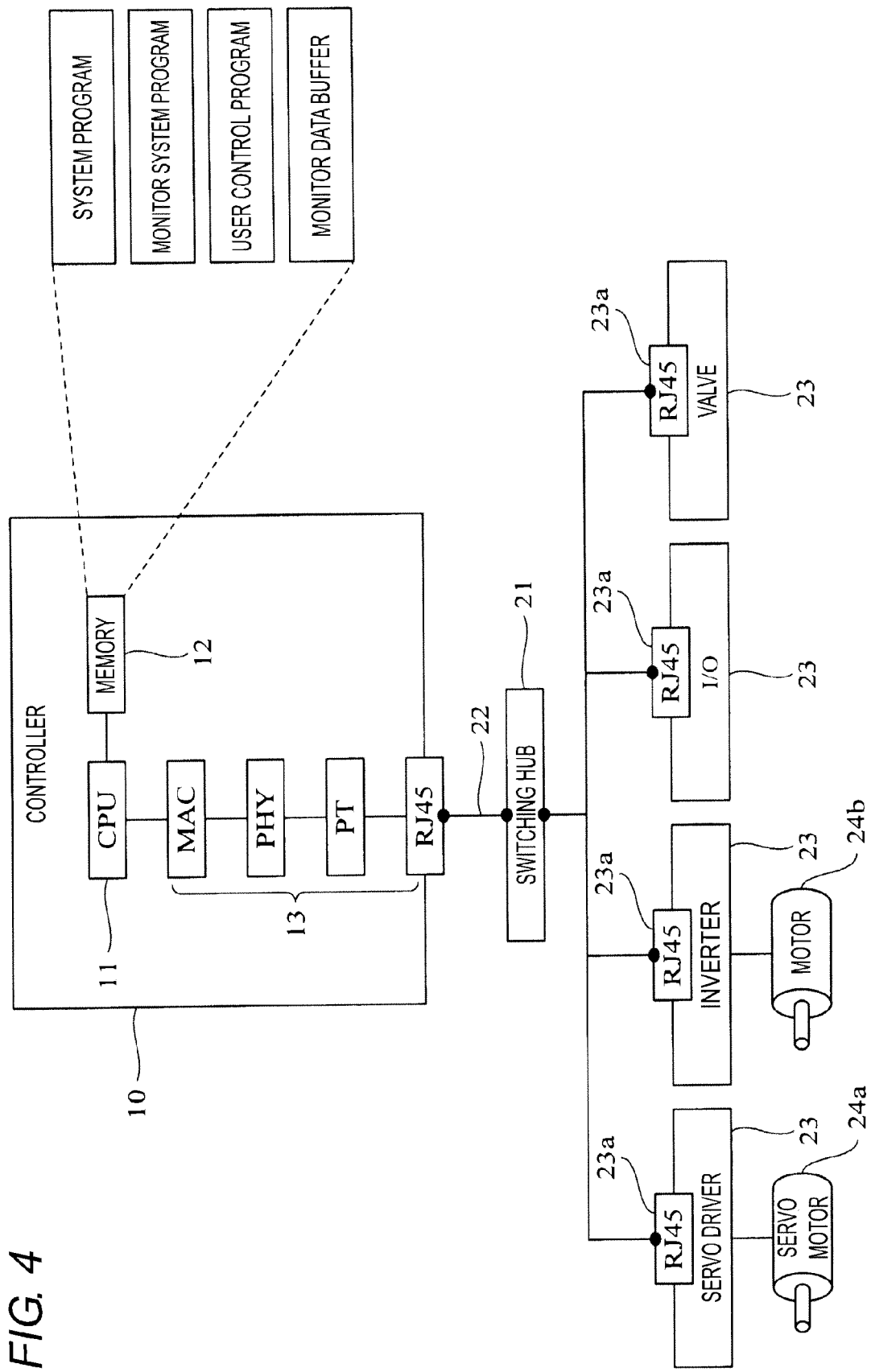
FIG. 4 is a view showing one example of an FA network system incorporating a controller according to the present invention.

FIG. 4 shows one example of an FA network system including a controller 10 for FA such as a programmable controller and a motion controller according to the present invention. In the present embodiment, Ethernet (registered trademark) is used for the communication protocol. The controller 10 performs transmission and reception of IO data such as IN data/OUT data with a remote device (slave) 23 through a switching hub 21. The remote device 23 includes a servo driver for controlling the operation of a servo motor 24a, an inverter for controlling the operation of a normal motor 24b, an I/O terminal, a valve, and the like. The remote device 23 has a connector 23a for attaching the terminal of a protocol compliant communication cable 22 such as the RJ45, and is connected to a predetermined port of the switching hub 21 through the communication cable 22.

The controller 10 includes a CPU 11 responsible for control, a memory 12 for storing programs and the like for the CPU 11 to operate, and a connection interface 13 for connecting to the network. Such hardware configuration is similar to the related art. As shown in the figure, the connection interface 13 includes the RJ45, which acts as a connector for attaching the terminal of the communication cable 22 complying with the communication protocol, the PT: pulse transformer, the PHY: physical layer, the Mac: media access controller, and the like. These are also implemented with those similar to the related art.

In the present invention, the controller 10 is mounted with a data collecting function of the protocol monitor. Such collecting function (protocol monitor function) can be implemented with an application program. That is, the basic hardware configuration for implementing the protocol monitor function can be shared with the hardware of the controller such as the PLC, and can be integrated as hardware. The memory 12 stores a monitor system program in addition to the system program for performing the basic operation of the controller, and the user control program (sometimes also referred to as user program) for actually performing the control. The monitor system program is a program for implementing the protocol monitor function. The CPU 11 executes each program stored in the memory 12 to function as the original controller for performing the control of the FA system, or to function as the protocol monitor. One of such functions may be operated, or both functions may be operated in parallel.

Furthermore, the memory 12 includes a monitor data buffer for storing the IO data for analysis. The monitor data buffer can automatically stop when receiving up to the buffer capacity, and can continue the operation continuously, as a normal ring buffer, to the control condition by discarding the data in order from the oldest.

Although not illustrated, the memory 12 ensures a work area used by the CPU 11 when executing the operation and ensures an IO memory area for storing the IO data and the like in addition to the programs. A nonvolatile memory and a volatile memory are used for such memories depending on the application.

Figure 5:
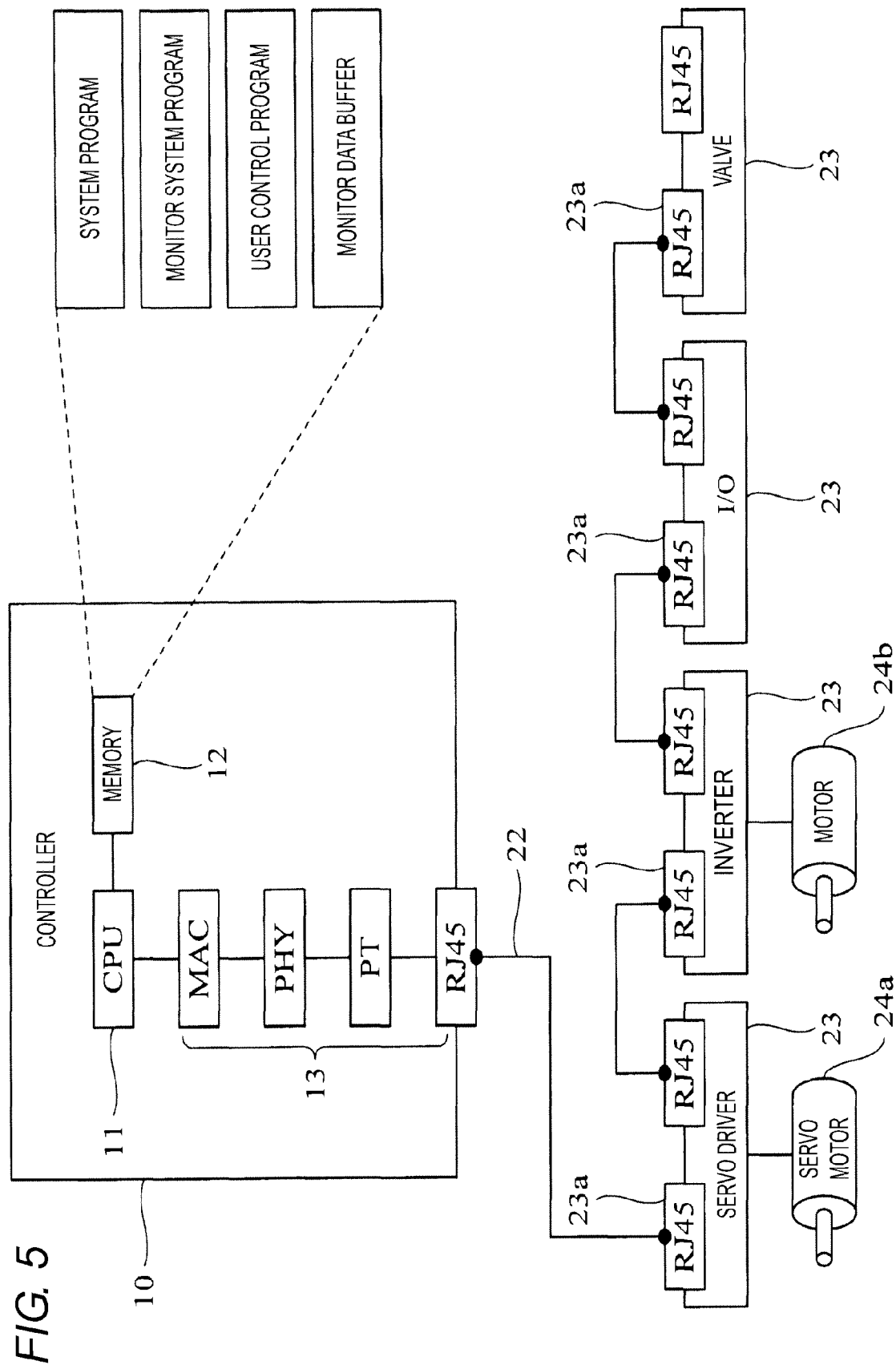
FIG. 5 is a view showing another example of an FA network system incorporating a controller according to the present invention.

The controller 10 does not need to use the mirror port function of the switching hub as in the related art as the protocol monitor function is incorporated. As a result, the switching hub 21 that is not mounted with the mirror port function can be used, and use can be made in a network system where the switching hub does not exist, as shown in FIG. 5. FIG. 5 is an example applied with respect to the EtherCAT (registered trademark). The EtherCAT responds to FA in compliance with the Ethernet (registered trademark) and is a communication protocol enabling higher speed communication, and adopts a configuration of connecting with wiring across the remote device 23.

In the present embodiment, the controller 10 itself that controls each device and apparatus connected to the FA network system detects abnormality, and the controller 10 directly stops the incorporating protocol monitor to stop the monitoring in the protocol monitor and to hold the previous data. The abnormality detection on the system thus can respond not only to the data pattern on the communication frame, but also to the inappropriateness of control timing and the detection by an advanced algorithm that depends on plural data, whereby the protocol monitor can be easily stopped without requiring a special setting skill. Furthermore, since the controller itself can perform the control on the stop/start operation of the protocol monitor function, the data communicated at the moment (immediately before) of occurrence of trouble can be left as the monitor data.

Figure 6:
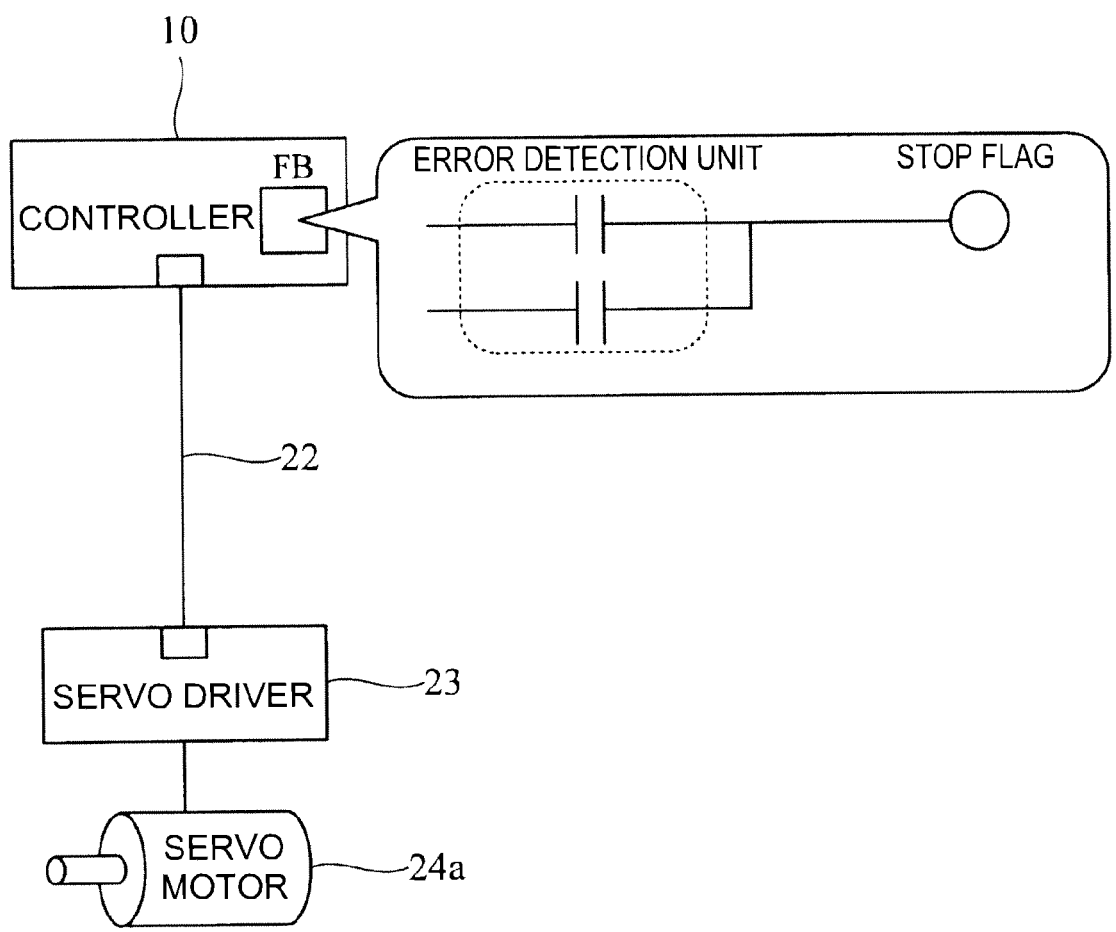
FIG. 6 is a view describing an abnormality detection function.

Accompanied therewith, the control condition of the monitor function stored in the memory 6b of the protocol monitor 6 of the related art is described in the user control program of the controller and stored in the memory 12. In other words, as shown in FIG. 6, one user control program is an abnormality detection function block FB as shown in the figure. When the function block FB detects abnormality, one of the contacts of an error detection unit is turned ON and a stop flag, which is the output, is turned ON. As hereinafter described, the protocol monitor is stopped when the stop flag is turned ON, so that the data collected until immediately before can be left as is as the monitor data. When the contact of the error detection unit is turned OFF, the stop flag is also turned OFF, and the monitor can be resumed. Therefore, since the control of start/stop of the monitor can be described with the ladder program, the monitor function can be controlled, not limited to a technician specializing in network, as long as the technician has the ability of a control programmer of the controller.

The determination logic of stopping the monitor when the contact of the error detection unit is turned ON may be communication time-out, link down, control data abnormality, control timing abnormality, and the like. The abnormality determination may not only be the user program, and the system may automatically determine the abnormality (transmission error such as link down, FCS error) of a certain extent and then stop.

Figure 7:
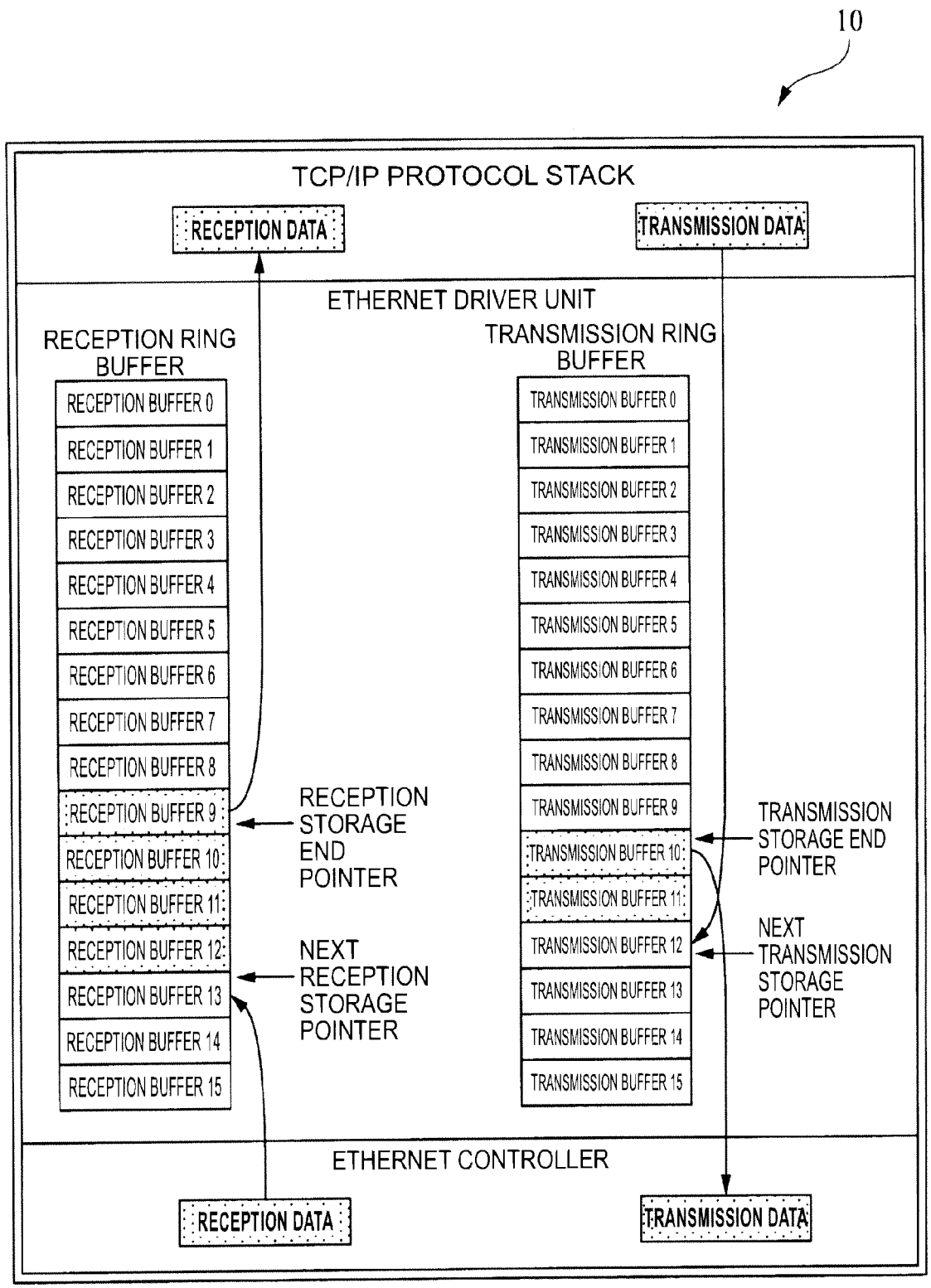
FIG. 7 is a view describing a communication method using a ring buffer at normal time.

In the present embodiment, the buffer amount of the ring buffer for temporarily storing the transmission/reception data is made greater than normal, as shown in FIG. 7. In other words, in the present embodiment, a reception buffer and a transmission buffer are ensured in the Ethernet driver unit to realize a full-duplex transmission (simultaneous execution of reception process and transmission process) as a software structure same as in a general case. The respective buffers form a structure of a general ring buffer by a buffer array (represented with 16 buffers, 0 to 15 for the sake of convenience in the figure) of a buffer amount longer than the buffer amount required in the general communication, and a storage end pointer and a next storage pointer.

The transmission data and the reception data stored in the respective ring buffer thus can be used as the data buffer of the frame monitor by having a long buffer amount. Actually, the buffer amount is a several hundred to a several thousand.

The transmission and reception using the ring buffer at the normal time in which abnormality has not occurred merely has larger data array, and can be carried out by the pointer process same as in the general case. In other words, the Ethernet controller provides the reception data to the Ethernet driver unit (reception request). The Ethernet driver unit stores the reception data in the reception buffer ("reception buffer 12" in the figure) set with the next reception storage pointer by the reception request from the Ethernet controller. Thereafter, the next reception storage pointer is incremented by one to prepare for the next reception. The pointer is returned to the reception buffer 0 when reaching the end of the data array.

The high-order module (TCP/IP and frame monitor in the figure) reads out the reception data stored in the reception buffer ("reception buffer 9" in the figure) indicated with the reception storage end pointer at an arbitrary timing. Thereafter, the reception storage end pointer is incremented by one to prepare for the next reading. The pointer is returned to the reception buffer 0 when reaching the end of the data array. Therefore, continuous reception process is performed by assuming the data array as the ring structure by the data array and the process by the pointer. Since the reception timing of the reception data of the controller 10 and the readout timing of the high-order module are indefinite, the data that is in the middle of being provided from the Ethernet controller to the TCP/IP of higher order tend to accumulate in the reception buffer if the readout delays. In the example of FIG. 7, the reception data stored in the reception buffers 9 to 12 from the reception storage end pointer to the next receivable pointer become the data that is in the middle of being provided from the Ethernet controller to the TCP/IP of higher order. The past reception data stored in the previous data (reception buffers 0 to 8, 13 to 15 in the figure) are then set with the next receivable pointer and remain until the reception data is subsequently stored.

Thus, the past data is held in the reception buffer for a constant period even after provided to the TCP/IP of higher order, where the past data after the provision can be used as is as the data of the frame monitor since the ring buffer with large buffer amount is adopted in the present embodiment. The information of the reception time and the transmission time necessary as the frame monitor data are ensured as one part of the data structure of the reception buffer and the transmission buffer, and stored with the reception cause and the transmission cause of the Ethernet driver. The above description is the same for the transmission process.

Therefore, the storage (copy) process to the monitor data buffer as in the related art is eliminated. In the present embodiment, the influence of performance on the reception process and the transmission process is no different from a general case although the data array of the ring buffer becomes large, and the process can be carried out at higher speed than the related art since the copy process to the monitor data buffer is eliminated.

The buffer area storing the past data after the provision is sequentially changed by the provision to the TCP/IP of higher order and the change of the pointer involved in the acceptance of new reception data. Thus, when some kind of failure occurs, the past data is rewritten by the newly received reception data by the movement of the next receivable pointer if communication is continued using the entire ring buffer, and hence the data for specifying the cause of occurrence of failure may be lost. This is the same for the transmission process.

Figure 8:
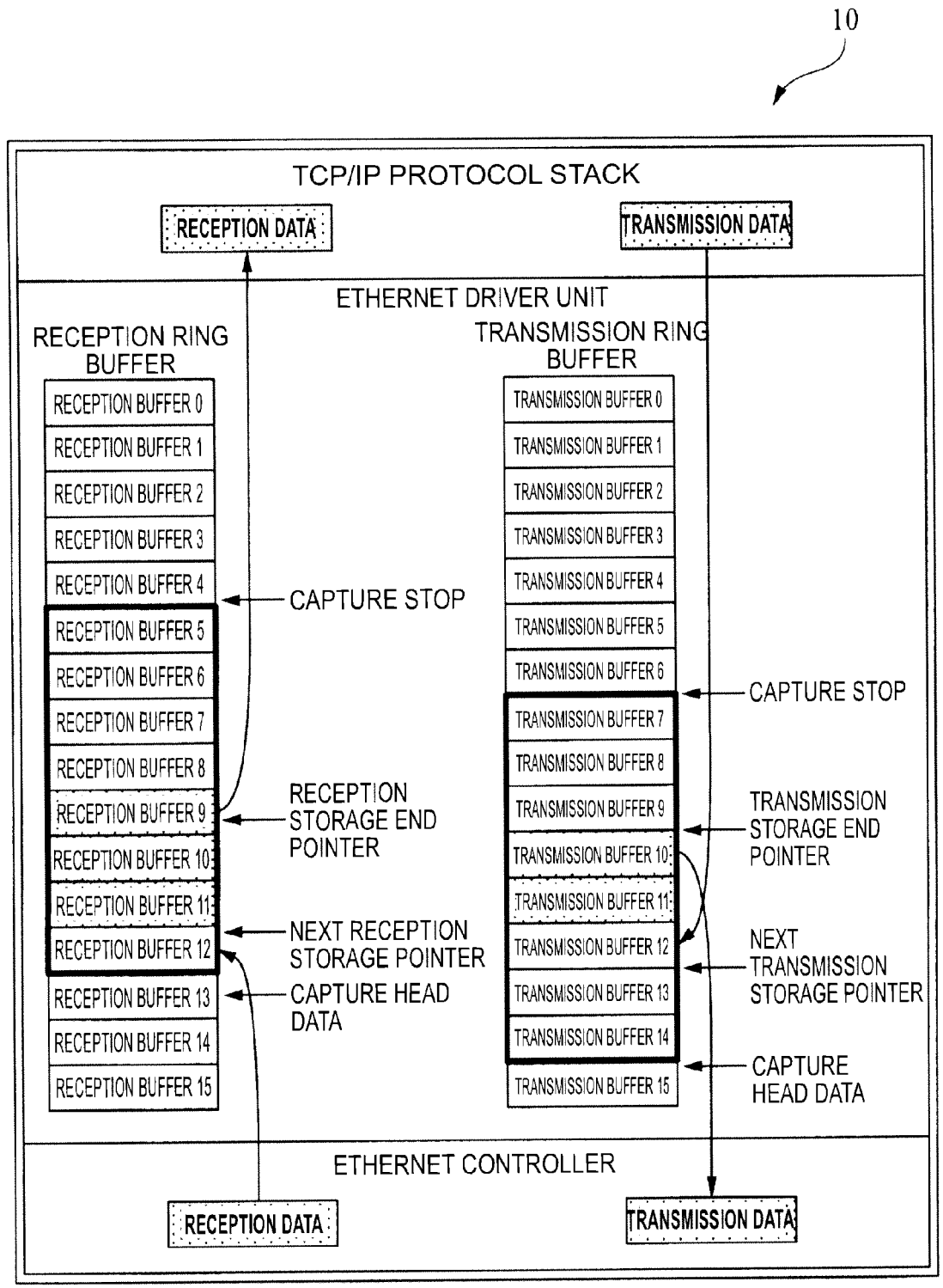
FIG. 8 is a view describing a communication method using the ring buffer at time of occurrence of abnormality.

As shown in FIG. 8, in the present embodiment, when failure occurs, the array of the ring buffer is made small, and the reception data is received and provided within the small array. The past data stored in other data regions thus can be held as is, and used as the frame monitor data.

Specifically, when the frame monitor operation stops after the application detects some kind of error, the pointer at the relevant time point is set as a capture stop pointer. In FIG. 8, the capture stop pointer is set with respect to the reception buffer 5 and the transmission buffer 7. The buffer amount necessary for general communication is ensured from the capture stop pointer to continuously operate the communication state even after the stop of the frame monitor (reception buffers 5 to 12, transmission buffers 7 to 14 indicated with heavy frame in the figure). The general communication uses the range of such buffer as the ring buffer for communication operation. The capture head data pointer is positioned next to the buffer used in the general communication. From such pointer to the capture stop pointer through the ring structure (reception buffers 13 to 4, transmission buffers 15 to 6 in the figure) are used as the frame monitor data.

Figure 9:
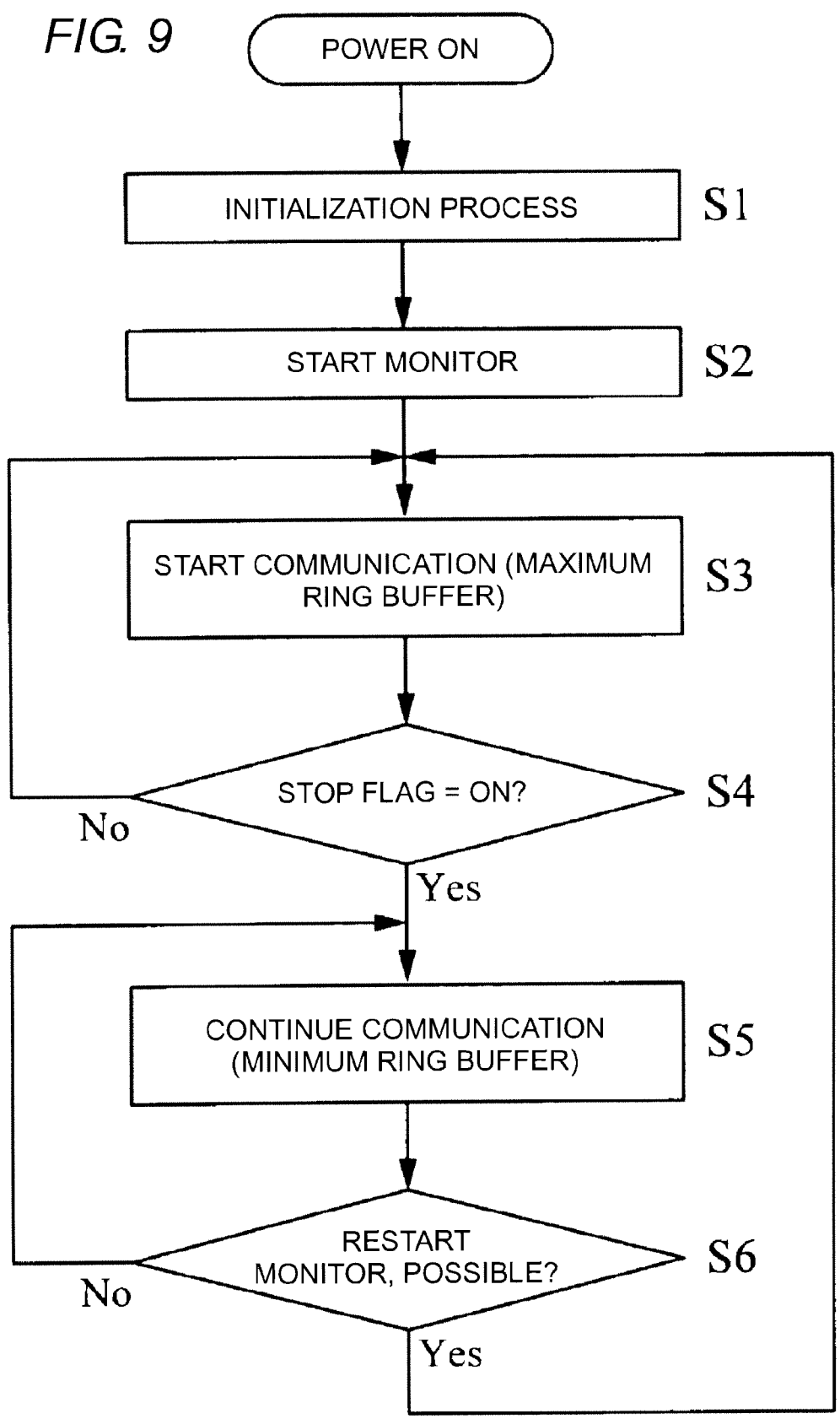
FIG. 9 is a flowchart describing the operation.

FIG. 9 is a flowchart showing the functions of the present embodiment. The controller 10 (CPU 11) initializes the Ethernet driver unit by turning ON the power (S1). Here, the Ethernet controller is initialized, and the ring buffer for transmission and reception, to be described later, is prepared.

In the present embodiment, the protocol monitor function does not influence the original system performance of the controller from the structure of the ring buffer and the control algorithm, and thus starts the monitor (capture) with the start of driving (S2).

After the capture is started, communication is started using all regions of the ring buffer (reception buffers 0 to 15, transmission buffers 0 to 15 in FIGS. 6 and 7) (S3). As described above, the stop flag is turned ON when the controller detects failure/abnormality, and thus communication is carried out using the maximum ring buffer that uses all regions as long as the state, in which the stop flag is turned OFF (No in S4), continues.

When the stop flag is turned ON (Yes in S4), the capture stop pointer is set and the communication is continued using a minimum ring buffer of a predetermined area therefrom (S5). The data (monitor data) remaining in the buffer other than the regions set to the minimum ring buffer becomes the data immediately before the occurrence of failure/abnormality, and thus the monitor data is uploaded to a predetermined analysis tool. An arbitrary means can be used to upload the monitor data, and for example, the monitor data may be converted to the file system information and uploaded from the high-order computer with the FTP function and the like. In the high-order computer, the cause etc. of failure/abnormality can be analyzed based on the uploaded monitor data. The network system can continue a stable communication using the ring buffer even by using the minimum ring buffer by setting a buffer amount that does not affect the communication.

When a restart command of the monitor function is provided from the programming tool device and the like at the timing the monitor data is uploaded, the branch determination of the processing step S6 becomes Yes, and the process returns to the processing step S3 to return to the state of performing transmission and reception using all ring buffers.

In the present embodiment, the protocol monitor function is mounted to the controller itself, and monitoring is performed from the beginning of the start of driving, and thus the data can be monitored from the first state even when failure/abnormality occurred for the first time. Thus, the data at the relevant time can be reliably held and analyzed even for the abnormality etc. of low occurrence frequency.

The monitor data is handled as a normal file. The network monitor software has various types, each of which has a data format of the monitor data file. The monitor data of the present invention does not particularly depend on the data format, and data format conversion and the like may be performed, if necessary. The analysis of the data sequence etc. and the analysis of the network load can be performed using the saved monitor data. The possibility an electrical disturbance such as noise to the network occurred can be indirectly analyzed by adding transmission error such as CRC error to the saved monitor data.

Furthermore, use can be made to the analysis of a so-called data mining such as semantic analysis of data since all input/output data with the remote device (servo motor, inverter motor, I/O, valve etc.) are stored as data transmitted and received with the controller. Furthermore, the data transmitted and received with the controller can be used as data to perform operation analysis on mechanical components actually driven by the remote device (servo motor, inverter motor, I/O, valve, etc.) with a 3D-CAD and the like, and can be used to analyze the behavior of the mechanical facilities before occurrence of trouble.

What is claimed is:

1. A Factory Automation (FA) controller comprising:
abnormality diagnosis function of determining presence of abnormality of a network to be connected;
protocol monitor function of monitoring data communicated with a device connected to the network;
function of holding the data monitored with the protocol monitor function in advance when abnormality is detected by the abnormality diagnosis function; and a ring buffer, and wherein the controller is further configured so that the data communicated with the device causes adoption of a communication method of initially being stored in the ring buffer;
wherein the data held in the ring buffer is used as monitor data and, when abnormality is detected by the abnormality diagnosis function, data immediately before the abnormality detection is held, and a communication after the abnormality is detected is continued using a region other than a region holding the data immediately before the abnormality detection in the ring buffer,
wherein the region within the ring buffer that is used after the abnormality is detected is defined by a capture stop pointer and a capture head data pointer, wherein the capture stop pointer is a position within the ring buffer where a next reception or transmission data is to be stored after the abnormality is detected, the capture head pointer being a position within the ring buffer that is next to a buffer portion within the ring buffer, in which the capture head pointer differs from the capture stop pointer by a pointer value corresponding to the buffer portion that is used for general communication when the abnormality is detected,
wherein the ring buffer includes a reception ring buffer and a transmission ring buffer, and wherein the capture head pointer and the capture stop pointer of the reception ring buffer differ in respective values from the capture head pointer and the capture stop pointer of the transmission ring buffer.

2. The controller according to claim 1, wherein the controller corresponds to Ethernet (registered trademark) or EtherCAT (registered trademark).

3. The controller according to claim 1, wherein the controller corresponds to Ethernet (registered trademark) or EtherCAT (registered trademark); and
the ring buffer is set in an Ethernet driver unit.

4. The controller according to claim 1, wherein the reception ring buffer and the transmission ring buffer are capable of enabling full-duplex transmission and reception with respect to the network.

* * * * *